US005600093A

United States Patent [19]
Herth et al.

[11] Patent Number: 5,600,093
[45] Date of Patent: Feb. 4, 1997

[54] DUAL PURPOSE ELECTRICAL BOX

[76] Inventors: Greg B. Herth, 10 Tower Mews; Jeffrey E. Davis, 103 Guillford Ave., both of Oakdale, N.Y. 11769

[21] Appl. No.: 225,054

[22] Filed: Apr. 8, 1994

[51] Int. Cl.⁶ .................................................. H02G 3/08
[52] U.S. Cl. ............................ 174/53; 220/3.5; 220/3.9
[58] Field of Search ............................... 174/53, 50, 48; 220/3.2, 3.3, 3.4, 3.5, 3.6, 3.8, 3.9

[56] References Cited

U.S. PATENT DOCUMENTS

| | | | |
|---|---|---|---|
| 3,895,732 | 7/1975 | Robinson et al. | 220/3.5 |
| 4,424,406 | 1/1984 | Slater et al. | 174/65 |
| 4,436,952 | 3/1984 | Lockwood | 174/65 |
| 4,673,097 | 6/1987 | Schuldt | 220/3.5 |
| 4,757,158 | 7/1988 | Lentz | 174/53 |
| 4,936,794 | 6/1990 | Shaw et al. | 439/538 |

*Primary Examiner*—Kristine L. Kincaid
*Assistant Examiner*—Michael J. Cornelison
*Attorney, Agent, or Firm*—Alfred M. Walker

[57] ABSTRACT

A modular interchangeable electrical work box having a housing for mounting one or a plurality of electrical devices, such as switches or outlets. Each support module is adapted for supporting a specific electrical component and the support modules have fastener insert sheaths for fasteners, such as screws or nails, for attaching the work box to a residential wall stud so as to permit interchangeable positioning within the housing. The box is interchangeable in that it can be used for either a new work box in new construction or for an old work box for replacement of existing work boxes or upgrading electrical service.

5 Claims, 5 Drawing Sheets

5,600,093

DUAL PURPOSE ELECTRICAL BOX

FIELD OF THE INVENTION

This invention relates to residential and commercial electrical wiring and more particularly to modular electrical box for use either as a "new work box" or an "old work box".

BACKGROUND OF THE INVENTION

Electrical work boxes are utilized in buildings to distribute electrical power from the power supply to electrical devices such as outlets or switches. An electrical work box includes a metal or plastic housing containing a recess for electrical components such as wire outlets or switches.

Presently, conventional electrical boxes are referred to colloquially either new work boxes, for new building construction, or old work boxes, for retrofitting into existing buildings. New work boxes have protruding accessory exterior sheaths for nailing the new work boxes to exposed wood or metal studs within a building. However, because the screw or nail mounting brackets protrude up from the external silhouette shape of the work box, the brackets interfere with the flush mounting of the work box within a hole within a building wall. Moreover, old work boxes are frequently held in place by bent tabs which engage sheetrock boards thus minimizing stability, as the sheetrock is prone to gradually falling apart.

Existing electrical work boxes are described in U.S. Pat. Nos. 4,424,406 of Slater and 4,436,952 of Lockwood.

Lockwood '952 describes a work box with a conventional accessory screw holding bracket protruding up from the surface of one of the walls of the work box. The protruding bracket interferes with the flush placement of the work box within a hole within a wall corresponding in shape to the exterior of the work box.

Slater '406 describes a work box in general but is silent about a mounting means for the work box.

Changes in the number or type of electrical component switches or outlets require further modifications. Therefore, existing electrical work boxes are ill fitted for modifications.

OBJECTS OF THE INVENTION

It is therefore an object of the present invention to provide a dual purpose electrical work box which can be adapted for multiple uses in either new construction or existing building renovations.

It is another object of the present invention to provide an electrical work box with an internal fastener mounting bracket, for fasteners, such as screws or nails.

It is yet another object of the present invention to provide a work box with a screw mounting bracket which does not protrude above the exterior silhouette shape of the work box.

It is yet an object of the present invention to provide an electrical work box for electrical systems for buildings.

It is another object of the present invention to provide an electrical work box with a standard construction which can be expanded to meet different design specifications.

It is a further object of the present invention to provide a dual purpose electrical work box which eliminates or reduces new tooling requirements for changes in electrical component requirements of construction.

A further object of the present invention is to provide a dual purpose electrical work box which is economical to manufacture, easy to mount and sturdy of construction.

Therefore, these objects and related objects are attained in a dual purpose electrical work box having a structure for holding different electrical wall outlets for flush mounting of the work box in either new or renovated building walls. The electrical work box of the present invention may be made in various sizes, such as one gang, two gang, etc. to accommodate increasing electrical demand and number of outlets so as to permit switches or outlets to be added within the housing.

In a preferred embodiment, the electrical work boxes are formed with an angled channel within an internal fastener mounting bracket for inserting fasteners, such as nails or screws within building wall studs to provide a rigid flush fit of the electrical work box to the wall stud within the hole provided in the wall for the work box.

SUMMARY OF THE INVENTION

In accordance with the foregoing objects, and others which may become apparent, the present invention includes a dual purpose electrical work box housing for electrical devices, such as outlets or switches, with a recess therein for accommodating electrical wires within the recess.

The dual purpose electrical work box contains walls with no external screw mounting bracket protrusions to interfere with the fitting of the electrical work box within pre-cut holes within a building wall.

The work box contains internal built-in angled fastener mounting bracket channel sheaths for accommodating fasteners, such as wood screws or nails, for wooden studs, or self tapping screws for metal studs.

The electrical work box of the present invention is interchangeable, so that the dual purpose electrical work box can be mounted on either the left or right side of the wall stud, as the top and bottom of the electrical work boxes have mirror image configurations, so the electrical work box can be reversed upside down in position.

The electrical work box includes a front face support member with holes to accommodate the top and bottom of at least one electrical device, such as a wall outlet or switch, so that the interior of the outlet faces inward into the recess of the electrical work box, while the front of the device, such as the outlet or switch, is flush with the building wall.

Typically, the electrical work box of the present invention includes fastener mounting bracket portions on the top and bottom of the wall stud bearing side wall portion, in the vicinity of the internal angled built-in channelled brackets for the mounting fasteners, such as screws or nails.

The purpose of the terraced portions is to accommodate the angled screw sheaths so that the angled screw sheaths may be easily molded and so that the internal fastener mounting bracket within which the fastener, such as a nail or a screw, is inserted has perpendicular support surfaces, extending perpendicular from each other at approximately 90°, so that the mounting screw can be preferably inserted at 45°, halfway between the perpendicular support surfaces of the internal fastener mounting bracket.

DETAILED DESCRIPTION OF THE DRAWINGS

Figure 1:
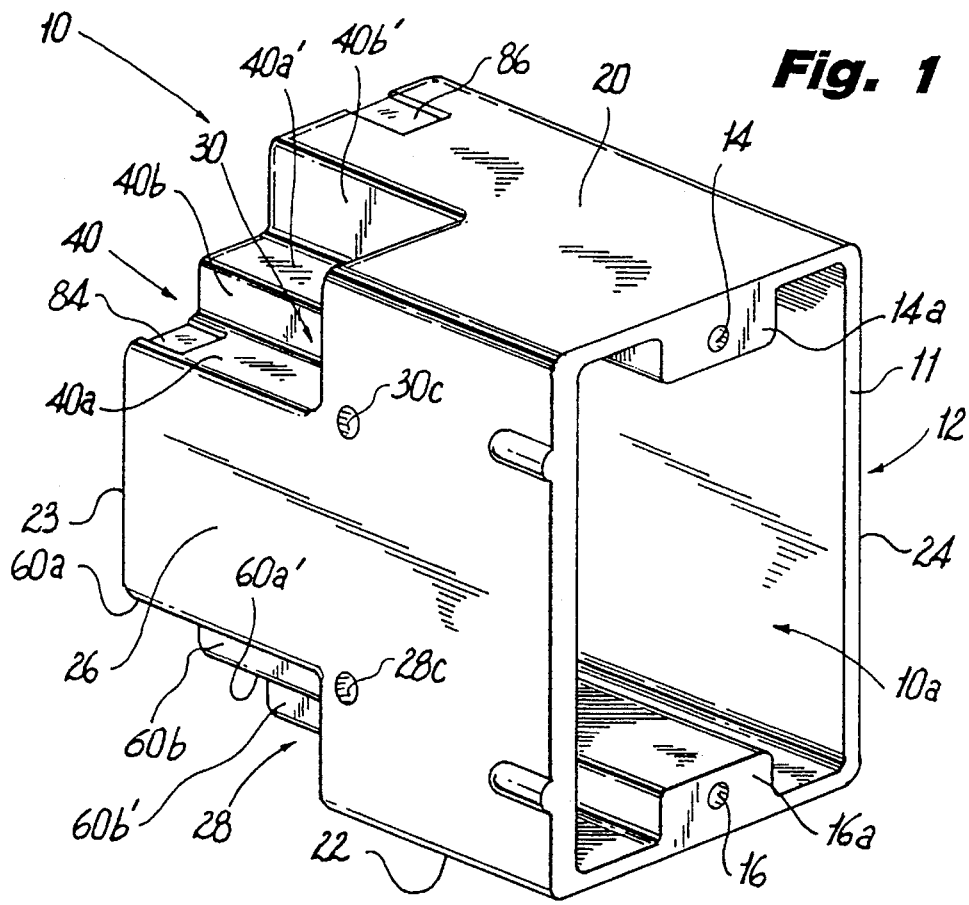
FIG. 1 is a top perspective view of the dual purpose electrical work box of the present invention.

The dual purpose electrical work box 10 of the present invention includes a housing 11 and a plurality of interchangeable fastener mounting brackets 28, 30 mounted within housing 11 for accommodating holding fasteners 32, such as screws or nails, for mounting the work box 10, in particular, within and flush to a building construction wall 36.

Work box 10 is interchangeable in that work box 10 can be used in old construction, which is retrofitted into an existing wall 36, wherein a generally rectangular cut is made in the sheetrock wall 36 and work box 10 is attached to wall stud 34, within the cut, which cut is shaped to conform to the generally rectangular shape of front face 12 of electrical work box 10.

Because work box 10 does not have an external protruding fastener mounting bracket, extending above the periphery of the outside walls, such as top wall 20, work box 10 can be easily and snugly fit in place within the cut made within wall 36.

In the alternative, electrical work box 10 may be used in new construction wherein work box 10 is attached tightly to stud 34 of wall 36.

Figure 2:
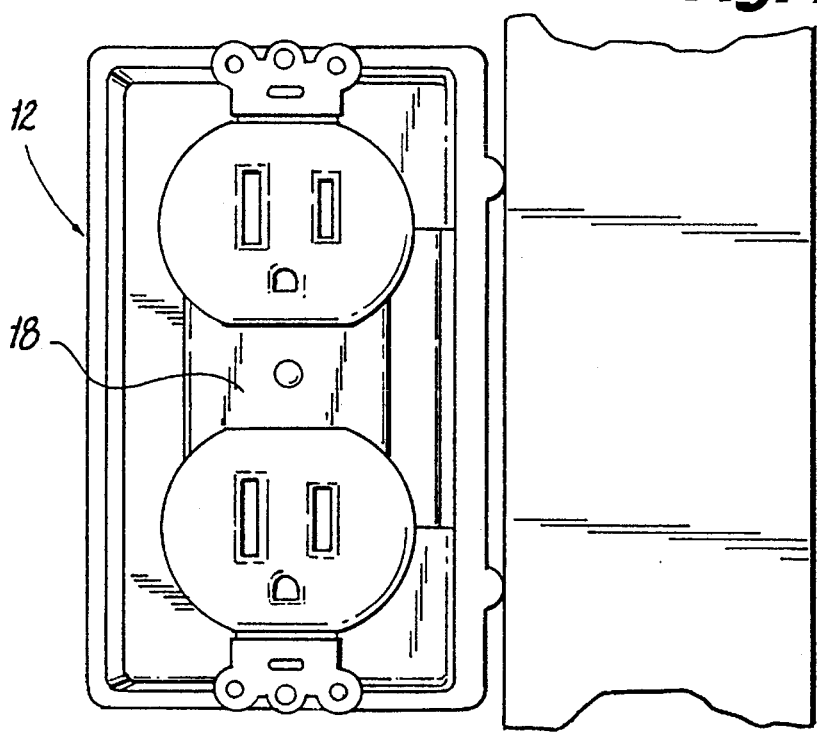
FIG. 2 is an front view of the work box shown in FIG. 1, showing a conventional outlet installed therein.
Figure 3:
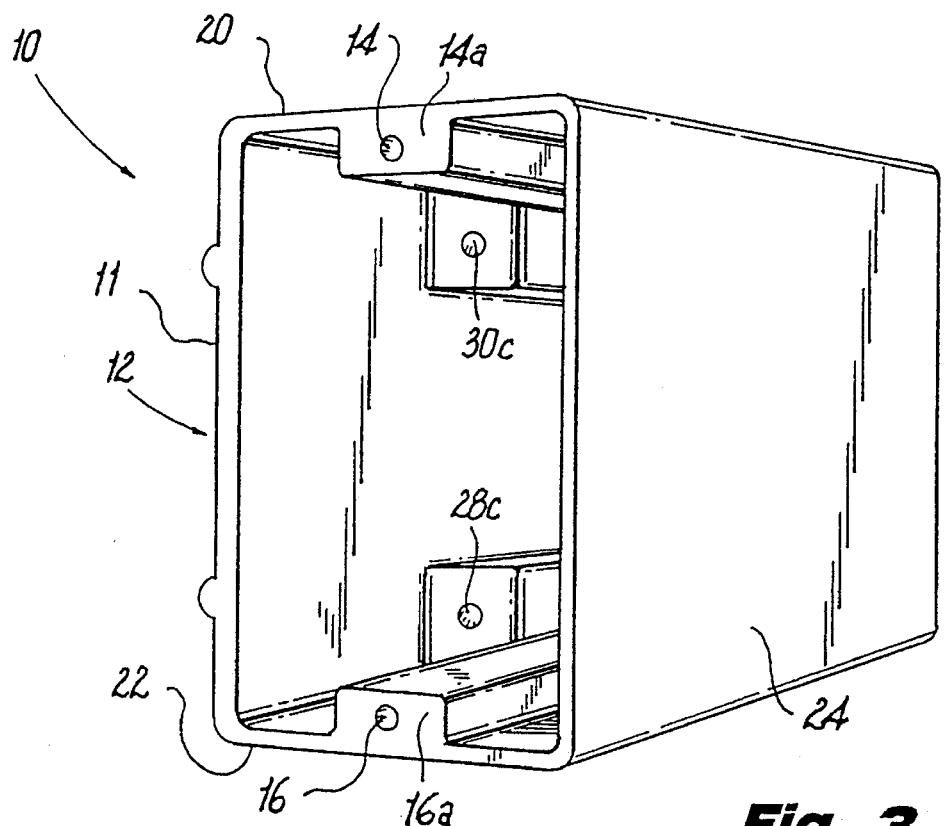
FIG. 3 is a further perspective view of the work box of FIG. 1.
Figure 4:
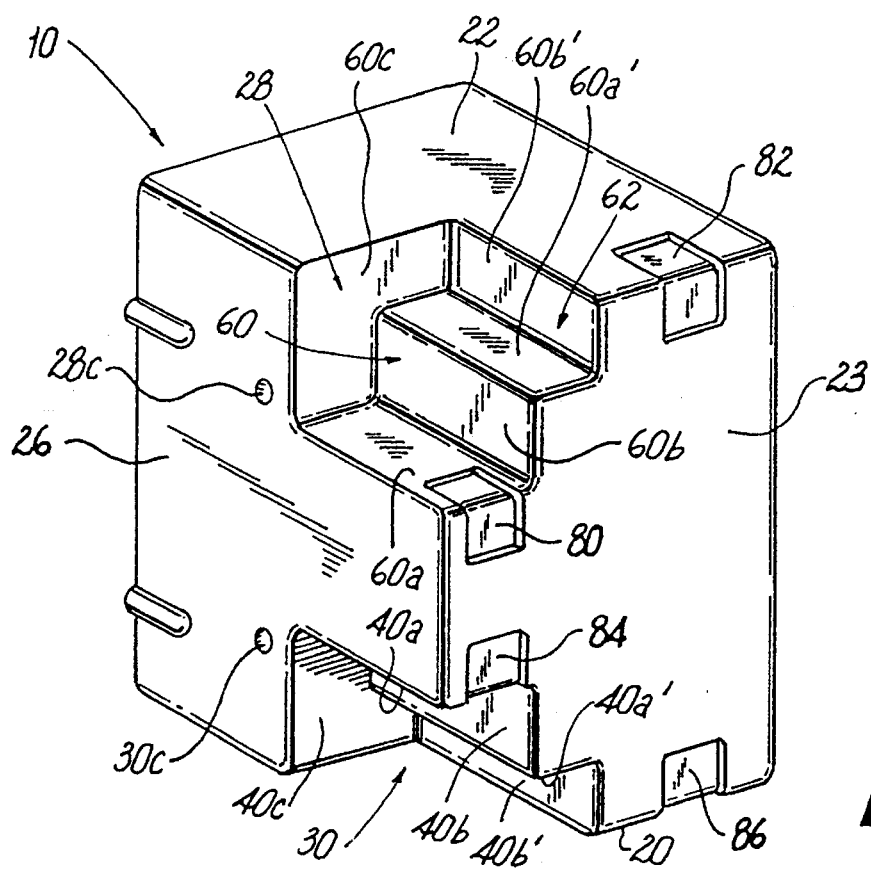
FIG. 4 is a rear perspective view of FIG. 3.
Figure 5:
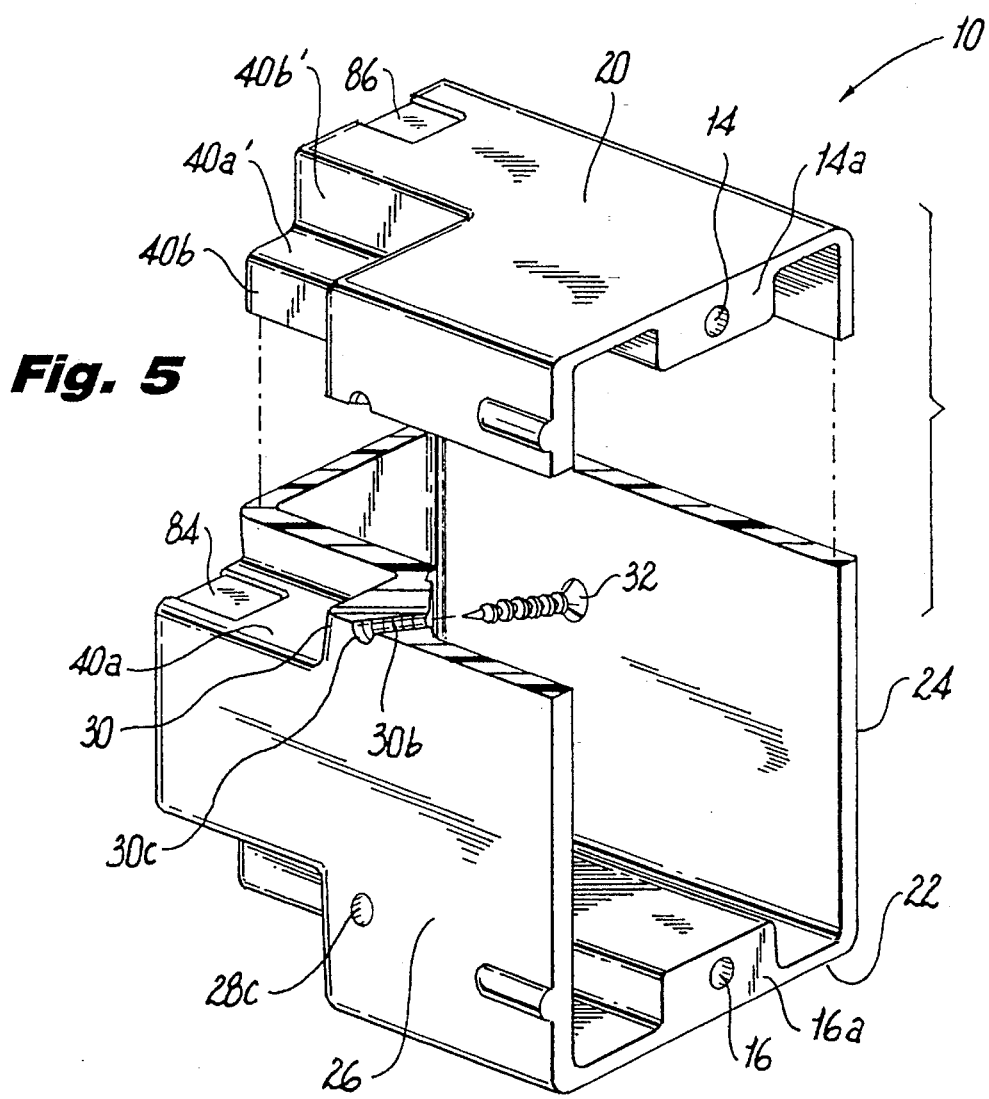
FIG. 5 is a left side exploded perspective view of the work box of FIG. 1.

In referring to FIGS. 1–6, work box 10 includes front face 12 having channel ports 14 and 16 for accommodating the conventional outlet 18 therein, as shown in FIG. 2. Work box 10 also includes top wall 20, bottom wall 22, rear wall 23, side wall 24 and side stud bearing wall 26 opposite to side wall 24. Mounting channels 14, 16 for holding screws for outlet 18 are bores within linear extension members 14a and 16a within channels 14 and 16 respectively. Extension members 14a, 16a extend perpendicular to the front face 12 of the work box 10 within interior recess 10a of work box 10 at the top and bottom respectively.

Work box 10 includes at least one fastener mounting bracket module 28, and preferably a second fastener mounting bracket module 30, for accommodating one or more mounting fasteners 32, such as screws or nails therein, wherein one fastener 32 is inserted within a sheath of internal screw mounting bracket 28 at an angle relative to the planar surface 26a of mounting wall 26 for screwing into a conventional building stud 34.

A second fastener 32, such as a screw or nail, may be mounted within further internal screw mounting bracket 30 of work box 10.

An advantageous feature of the electrical work box of the present invention is that the fastener channel 30b is fully contained within the confines of the walls of electrical work box 10, and the exterior hole 30c for screw hole channel 30b is flush with the exterior of stud bearing wall 26, so that no protruding portion interferes with the positioning of electrical work box 10 within the building wall.

As noted, fastener 32, such as screws or nails, may be mounted within a wood stud 34 and self tapping screws (not shown) may be mounted within metal walls (not shown). Fasteners 32 must be mounted at an angle, generally 45°, although fasteners 32 may vary in range from 30° to 60° for two reasons.

First, because work box 10 is recessed within the surface of wall 36, generally sheetrock, it is difficult for physical access to insert a fastener, such as a hammer or a screwdriver, therefore the fastener must be inserted at a angle within interior recess 10a of electrical work box 10.

Second, there is more structural stability of the mounting of work box 10 when fastener 32 is inserted at an angle within stud 34.

To insert fastener 32, such as a screw, at a stable configuration, upper fastener mounting bracket 30 is generally triangular shaped when viewed in cross-section, so that fastener 32 is screwed or otherwise applied into a bearing face 30a of fastener mounting bracket 30, which bracket has a plane which is perpendicular to the angle of the fastener 32 being inserted within fastener hole channel 30b of fastener mounting bracket 30.

Lower fastener mounting bracket 28 has fastener bearing face 28a, fastener hole channel 30b with exterior hole 30c.

For ease of manufacturing, electrical work box 10 is made in a terraced wall configuration, as shown in the drawing figures, wherein side wall 26 is generally T-shaped when viewed from the side. Fastener mounting bracket 30 has terraced wall portions 40 and 42 wherein each terraced wall portion 40, 42 has horizontal flat wall, 40a, 40a' extending perpendicular to the surface of side wall 26 and vertical portions 40b, 40b' parallel to the plane of side wall mounting surface 26, together with a further vertical upside down L-shaped surface 40c, which extends perpendicular to the plane of side wall 26 but also perpendicular to respective vertical wall 40b.

At the lower portion of the side wall 26 there is also a similar fastener mounting bracket 28 which further has terraced wall portions 60 terraced wall portion 60 includes horizontal walls 60a, 60a' and vertical wall 60a, 60b' perpendicular to a further L-shaped vertical wall 60c, which itself is perpendicular to respective horizontal walls 60a, 60a' and side surface 26

Figure 6:
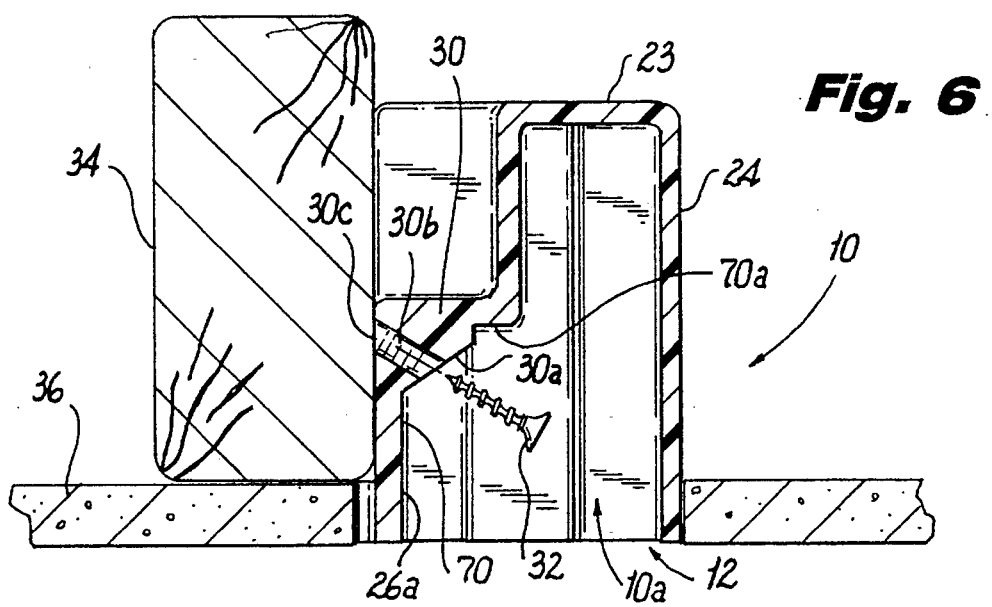
FIG. 6 is a top plan view of the work box of FIG. 1.
Figure 8:
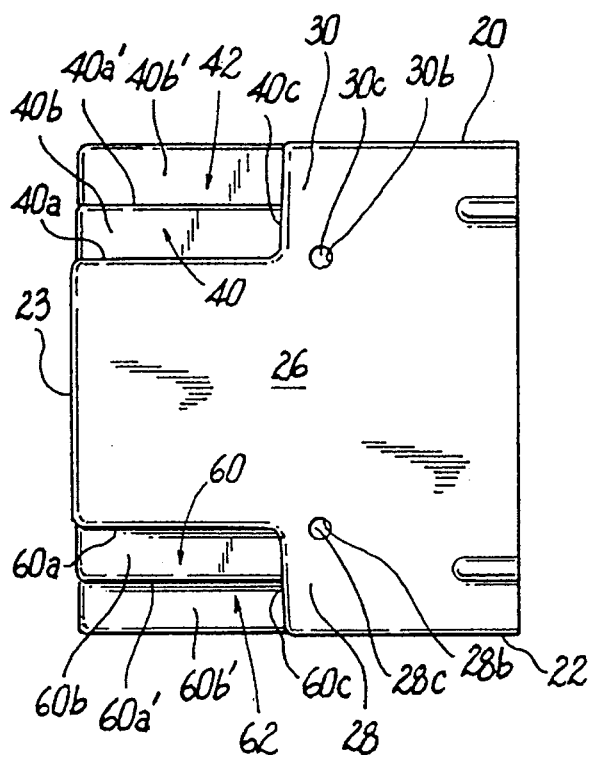
FIG. 8 s a left side elevational view of the work box as in FIG. 1.
Figure 7:
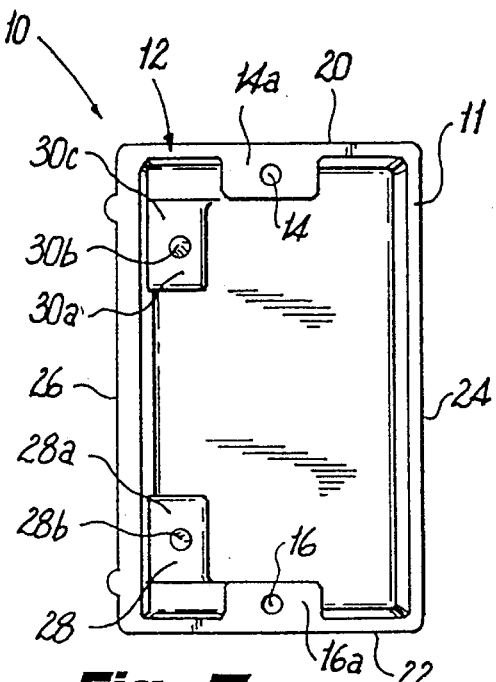
FIG. 7 is a front end view of the work box as in FIG. 1.
Figure 9:
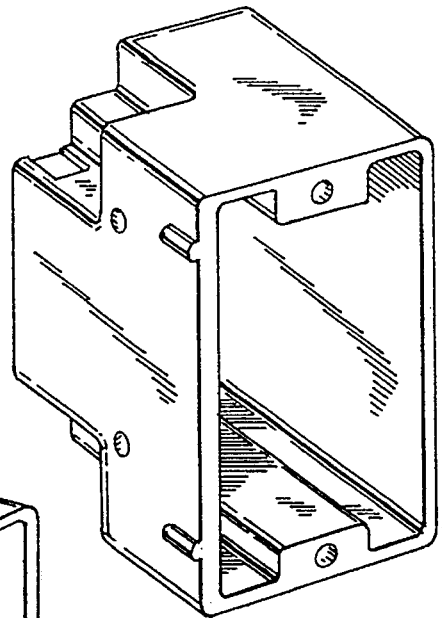
FIG. 9 s a further perspective view of a single gang electrical work box.
Figure 10:
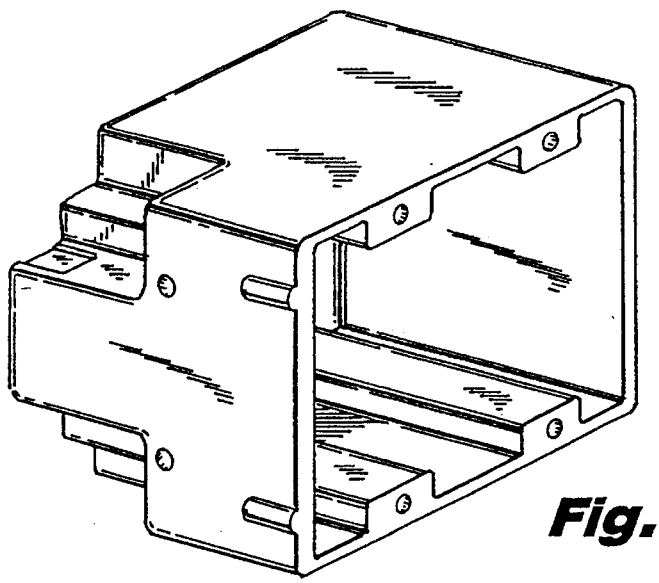
FIG. 10 is a further perspective view of a double gang electrical work box.
Figure 11:
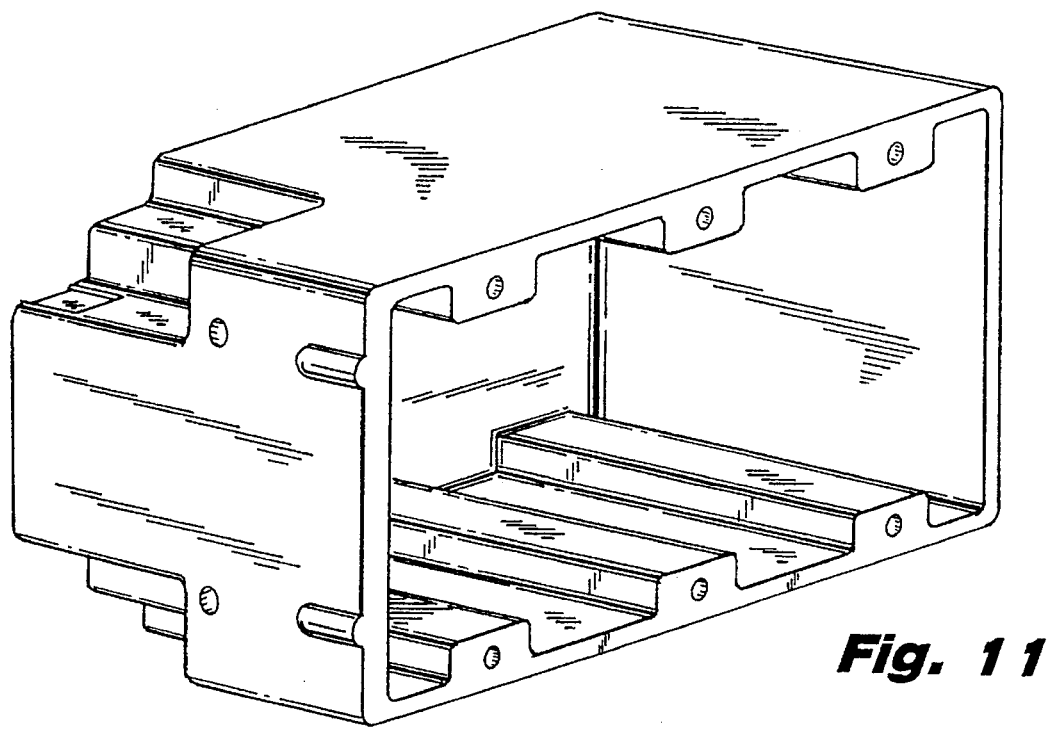
FIG. 11 is a further perspective view of a triple gang electrical work box.
Figure 12:
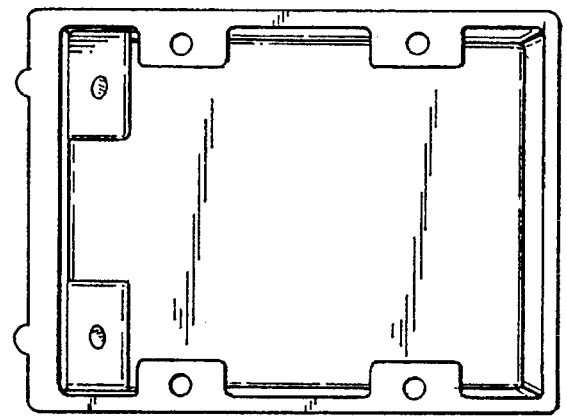
FIG. 12 is a front end view of a double gang work box as in FIG. 10.
Figure 13:
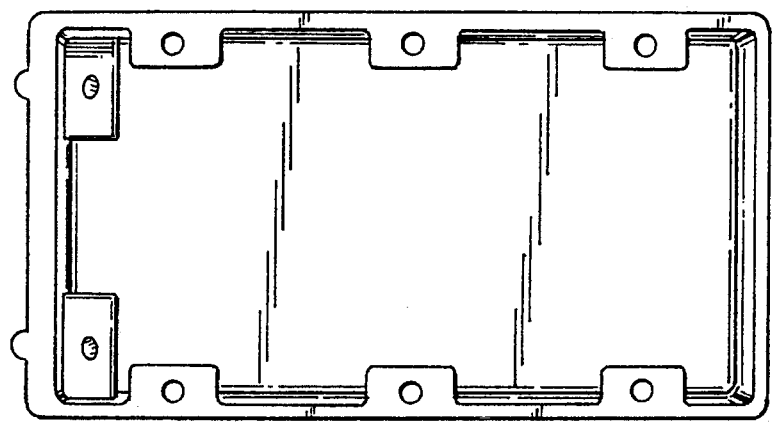
FIG. 13 is a front end view of a triple gang work box as in FIG. 11.

Referring now to FIG. 6, the internal triangular fastener mounting bracket 30 extends at an angle between vertical wall face 70 and further wall 70a, which further wall 70a is perpendicular to wall 70. The purpose of this configuration is that the mechanical stress of the fastener, such as a screw 32, is distributed generally evenly up against vertical wall 70 and up against horizontal wall 70a at right angles.

The configuration of electrical work box 10 of the present invention also assists in ease of manufacturing so that there are no large blocks of unused plastic solid material. The specific design of electrical work box 10 depends on the particular electrical components to be shown. For example, as shown in FIGS. 9–13, electrical work box may be one gang, two gang or three gang boxes wherein one, two or three devices, such as switches or outlets are attached to the preferred electrical work box.

As noted further, stud bearing wall 26 of work box 10 is generally but not necessarily, thicker than the other walls 20, 22, 23 or 24 because mounting wall 26 is the load bearing surface of work box 10 against stud 34 of wall 36.

Electrical work box 10 also has conventional apertures with push in clamping covers 80, 82, 84 and 86 to accommodate conventional incoming wires into and out of work box 10. These apertures receive the wires for attachment to the outlet 18 attached to the front face 12 of the work box.

For installation, work box 10 is inserted flush in a hole cut in sheetrock panel 36 and then work box 10 is attached by fasteners, such as screws 32, to stud 34. In new construction, electrical work box 10 is similarly attached.

Therefore, the present invention is an improvement over the prior art because electrical work box 10 is interchangeable, whether it functions as an electrical work box for new work or old work. Conventional Madison-type clips may be used for securing the work box to the sheetrock. However because of the stability of the present configuration of electrical work box 10, auxiliary Madison clips may not be needed.

Work box 10 is mirror image reversible, so that lower fastener mounting bracket 28 for fastener 32, such as a screw, may be also an upper fastener mounting bracket when work box 10 is inserted upside down within wall 36.

Moreover, since work box 10 has no external fastener mounting brackets, it is easily mountable flush within a cut within wall 36.

It is understood that the configuration as shown is merely an example, and that the shape of the particular electrical work box may be determined by specific requirements for specific installations.

Electrical work box 10 eliminates the need for stocking two kinds of work boxes, since electrical work box 10 can function as either a new work box or an old work box. Electrical work box 10 is easy and economical to manufacture and install, and forms a strong attachment to the wall studs in building construction.

Furthermore, various modifications may be made to the present invention, which will become apparent from the pending claims, without departing from the spirit and scope of the present invention, as is noted in appended claims.

We claim:

1. A modular electrical work box for use as a new work box or an old work box, in a building to distribute electrical power from the power supply to electrical outlets, said electrical work box comprising:

a housing including a top wall, a bottom wall, a rear wall, a first side wall and a stud bearing side wall opposite said first side wall;

said housing of said work box containing a recess therein for insertion of electrical components, including wires and outlets therein;

said electrical work box further having at least one internal angled fastener mounting bracket therein for inserting a mounting fastener within a wall stud to provide a rigid fit of said work box to said wall stud;

said at least one fastener mounting bracket accommodating at least one mounting fastener therein;

said work box including a face support member, said face support member having at least one hole accommodating at least one electrical outlet, wherein an interior of said outlet faces into said recess within said housing of said electrical work box;

said at least one fastener mounting bracket being located internally within said work box, said work box being attachable to said stud bearing side wall, said at least one fastener mounting bracket including an angled sheath for said at least one mounting fastener for mounting said electrical work box within a wall of the building;

said at least one fastener mounting bracket including a flat horizontal wall substantially perpendicular to said stud bearing side wall and a vertical wall substantially perpendicular to said flat horizontal wall, said angled sheath extending at an angle relative to said vertical wall;

said at least one fastener mounting bracket having an exterior hole within said stud beating side wall, said exterior hole being flush with said stud bearing side wall.

2. The electrical work box as in claim 1 wherein said vertical wall is a first vertical wall and said at least one fastener mounting bracket further includes a second vertical wall perpendicular to both said flat horizontal wall and said stud bearing side wall.

3. The electrical work box as in claim 1 wherein said at least one fastener mounting bracket comprises a plurality of fastener mounting brackets.

4. The electrical work box, as in claim 2, further comprising a triangular fastener mounting body, said body having a bearing face extending at 30°–60° angle off of said flat horizontal wall, said bearing face being substantially perpendicular to an angle of said angled sheath for insertion of said fasteners, said at least one triangular fastener mounting body disposed between a vertical support wall and a horizontal support wall.

5. The electrical work box as in claim 2, wherein said at least one fastener mounting body has a bearing face extending at about a 45° angle off of said flat horizontal wall.

* * * * *